United States Patent
Gingrich et al.

(10) Patent No.: US 9,143,182 B2
(45) Date of Patent: Sep. 22, 2015

(54) ADAPTIVE COSITE ARBITRATION SYSTEM

(75) Inventors: Mark A. Gingrich, Owego, NY (US);
Tommy Lam, Apalachin, NY (US);
Andrew G. Walsh, Endicott, NY (US)

(73) Assignee: Lockheed Martin Corporation,
Bethesda, MD (US)

( * ) Notice: Subject to any disclaimer, the term of this patent is extended or adjusted under 35 U.S.C. 154(b) by 567 days.

(21) Appl. No.: 13/454,454

(22) Filed: Apr. 24, 2012

(65) Prior Publication Data

US 2013/0281031 A1   Oct. 24, 2013

(51) Int. Cl.
*H04B 1/40* (2015.01)
*H04B 1/525* (2015.01)

(52) U.S. Cl.
CPC . *H04B 1/40* (2013.01); *H04B 1/525* (2013.01)

(58) Field of Classification Search
CPC ........ H04B 1/7103; H04B 15/00; H04B 1/71; H04B 1/1027; G01J 3/26
USPC .......... 455/41.2, 296, 24, 278.1, 304
See application file for complete search history.

(56) References Cited

U.S. PATENT DOCUMENTS

| | | | |
|---|---|---|---|
| 4,313,038 A | 1/1982 | Nilssen et al. | |
| 5,630,223 A * | 5/1997 | Bahu et al. | 455/296 |
| 6,714,775 B1 | 3/2004 | Miller | |
| 6,724,840 B1 | 4/2004 | Osofsky et al. | |
| 7,027,776 B2 | 4/2006 | Wilson et al. | |
| 7,181,233 B2 | 2/2007 | Fry | |
| 7,746,291 B2 * | 6/2010 | Rofougaran | 343/861 |
| 8,023,921 B2 * | 9/2011 | Lackey | 455/307 |
| 8,787,838 B2 * | 7/2014 | Kauppert et al. | 455/67.13 |
| 8,938,041 B2 * | 1/2015 | Arambepola et al. | 375/350 |
| 2005/0215204 A1 | 9/2005 | Wallace et al. | |
| 2006/0039511 A1 | 2/2006 | Nachamkin et al. | |
| 2007/0140391 A1 | 6/2007 | Pan | |
| 2007/0155351 A1 * | 7/2007 | Oba et al. | 455/188.2 |
| 2010/0002815 A1 * | 1/2010 | Yan | 375/350 |

FOREIGN PATENT DOCUMENTS

JP  2005038228 A  2/2010

* cited by examiner

*Primary Examiner* — Andrew Wendell
*Assistant Examiner* — Maryam Soltanzadeh
(74) *Attorney, Agent, or Firm* — Wolf, Greenfield & Sacks, P.C.

(57) ABSTRACT

A system for coupling a communication unit to an antenna. The system includes a tunable bandpass filter and a second tunable filter, such as a tunable low-pass filter, in parallel with the tunable bandpass filter. The system also includes a measurement and control unit configured to measure a frequency of a signal generated by the communication unit and to tune the tunable bandpass filter to pass the signal generated by the control unit.

14 Claims, 3 Drawing Sheets

ADAPTIVE COSITE ARBITRATION SYSTEM

DISCUSSION OF RELATED ART

Cosite interference can occur in communication systems having more than one communication unit sited at the same location. When more than one radio or other communication unit is transmitting and/or receiving information at the same time, they may interfere with one another.

For example, an aircraft may have multiple communication systems including both a radio and a data link that can transmit and receive signals through separate channels. Transmissions from one of these systems can cause interference with the other system, particularly if these communication systems operate on nearby frequency bands. Typically, these communication systems are independent and not designed to interface with one other. To avoid interference, the communication devices could be re-designed to communicate with one another (i.e., handshake) to avoid interference. However, significant cost and design effort are needed to implement such solutions, as they are platform-specific custom designs. Upgrading such a customized system may require significant additional cost and effort.

Simple filtering techniques have been used to avoid interference between cosited antennas. However, the use of such filters can prevent reception of a desired signal, as the frequency of the incoming signal may not be known in advance.

SUMMARY

Some embodiments relate to a system for coupling a communication unit to an antenna. The system includes a tunable bandpass filter and a second tunable filter in parallel with the tunable bandpass filter. The system also includes a measurement and control unit configured to measure a frequency of a signal generated by the communication unit and to tune the tunable bandpass filter to pass the signal generated by the communication unit.

Some embodiments relate to a method of coupling a communication unit to an antenna. The method includes, in a transmit mode, measuring a frequency of a signal generated by the communication unit, and tuning a tunable bandpass filter to pass the signal. The method also includes, in a receive mode, tuning a second tunable filter in parallel with the tunable bandpass filter to pass a received signal.

Some embodiments relate to a computer readable storage medium having stored thereon instructions, which, when executed by a processor, perform any of the methods described herein.

The foregoing summary is provided by way of illustration and is not intended to be limiting.

DETAILED DESCRIPTION

Described herein is an example of a communication system and method that can reduce cosite interference while allowing desired signals be received at any of a plurality of frequencies. Such a system and method may be universally applied in any suitable application, can reduce cosite interference without requiring a control interface or handshaking between cosited communication units.

Figure 1:
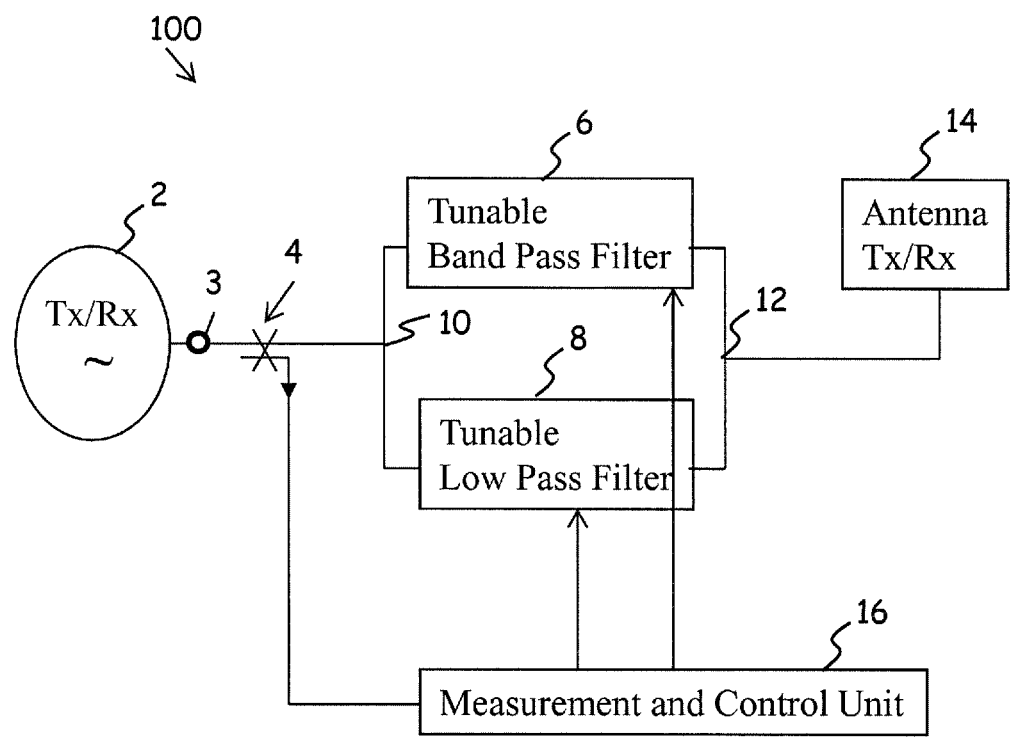
FIG. 1 shows an example of a communication system including filters as well as a circuit for controlling the filters and measuring a transmitted signal, according to some embodiments.

FIG. 1 shows an example of the communication system 100, according to some embodiments. The communication system 100 may include a communication unit 2 configured to transmit and/or receive radio and/or data link signals. Communication unit 2 may be any circuit for transmitting and/or receiving signals, including voice or data signals, as the techniques described herein are universal and can be applied to any suitable communication unit. Signals are transmitted and/or received by communication unit 2 via antenna 14. Communication unit 2 is connected to antenna 14 via a parallel combination of a tunable bandpass filter 6 and a tunable low-pass filter 8. The first terminals of the tunable bandpass filter 6 and tunable low-pass filter 8 are connected together at a tee 10, and second terminals of the tunable bandpass filter 6 and tunable low-pass filter 8 are connected together at a second tee 12. A coupler 4 is coupled to the input/output terminal 3 of the communication unit 2 to produce a coupled signal representative of the signal appearing at terminal 3. The coupled signal from coupler 4 may be provided to a measurement and control unit 16. In some embodiments, measurement and control unit 16 includes measurement circuitry to measure the frequency, power and/or other parameters of the coupled signal. For example, when the communication unit 2 is a transmit mode, the measurement and control unit 16 may measure one or more parameters of the transmitted signal, such as its frequency.

As shown in FIG. 1, measurement and control unit 16 is coupled to the tunable bandpass filter 6 and the tunable low-pass filter 8. Measurement and control unit 16 includes a control unit that controls the tunable bandpass filter 6 and the tunable low-pass filter 8. Any suitable control unit may be used, such as an analog control unit or a digital control unit. If a digital control unit is used, the digital control unit may include a controller having a processer that executes a control algorithm.

The communication system 100 of FIG. 1 may operate as follows. The measurement and control unit 16 may measure the signal coupled from terminal 3 of the communication unit 2 to determine whether it is transmitting a signal. For example, the measurement and control unit may determine that the control unit 2 is in the transmit mode when the magnitude of the signal at terminal 3 exceeds a threshold. When the communication unit 2 is in the transmit mode, the measurement and control unit 16 measures the frequency of the transmitted signal at terminal 3 and controls the tunable bandpass filter 6 to be tuned to the frequency of the transmitted signal to allow the transmitted signal to pass to the antenna 14. In the transmit mode, the measurement and control unit 16 may control the tunable low-pass filter 8 to be tuned to a low frequency, well out of band with the transmitted signal, thereby presenting a high impedance to the transmitted signal.

When the communication unit 2 is in the receive mode, the measurement and control unit 16 may control the tunable low-pass filter 8 to have a cutoff at a high frequency, higher than that of any desired signal. As a result, substantially any signal which the communication unit 2 is capable of receiving can pass from the antenna 14 through the tunable low-pass filter 8 to the communication unit 2. In the receive state, the measurement and control unit 16 may control the tunable bandpass filter 6 to be tuned to a frequency well out of band from that of a received signal, such that the tunable band pass filter 6 presents a high impedance to any received signal.

The communication system 100 illustrated in FIG. 1 can reduce interference with cosited antennas by bandpass filtering the transmitted signal to reduce the amount of spurious signals transmitted. In addition, the system illustrated in FIG. 1 enables receiving a signal at substantially any desired frequency, without needing advance knowledge of the frequency of the signal to be received. In addition, the system illustrated in FIG. 1 has frequency filtering protection from Flow to Fhigh.

System 100 may also prevent damage to the communication unit 2 when the communication unit 2 changes states between the transmit mode and the receive mode. In particular, the impedance of the parallel combination of tunable bandpass filter 6 and tunable low-pass filter 8 in the transition state does not produce significant reflections back to the communication unit 2, thereby avoiding damage to communication unit 2, as will be discussed further below.

Figures 2A, 2B:
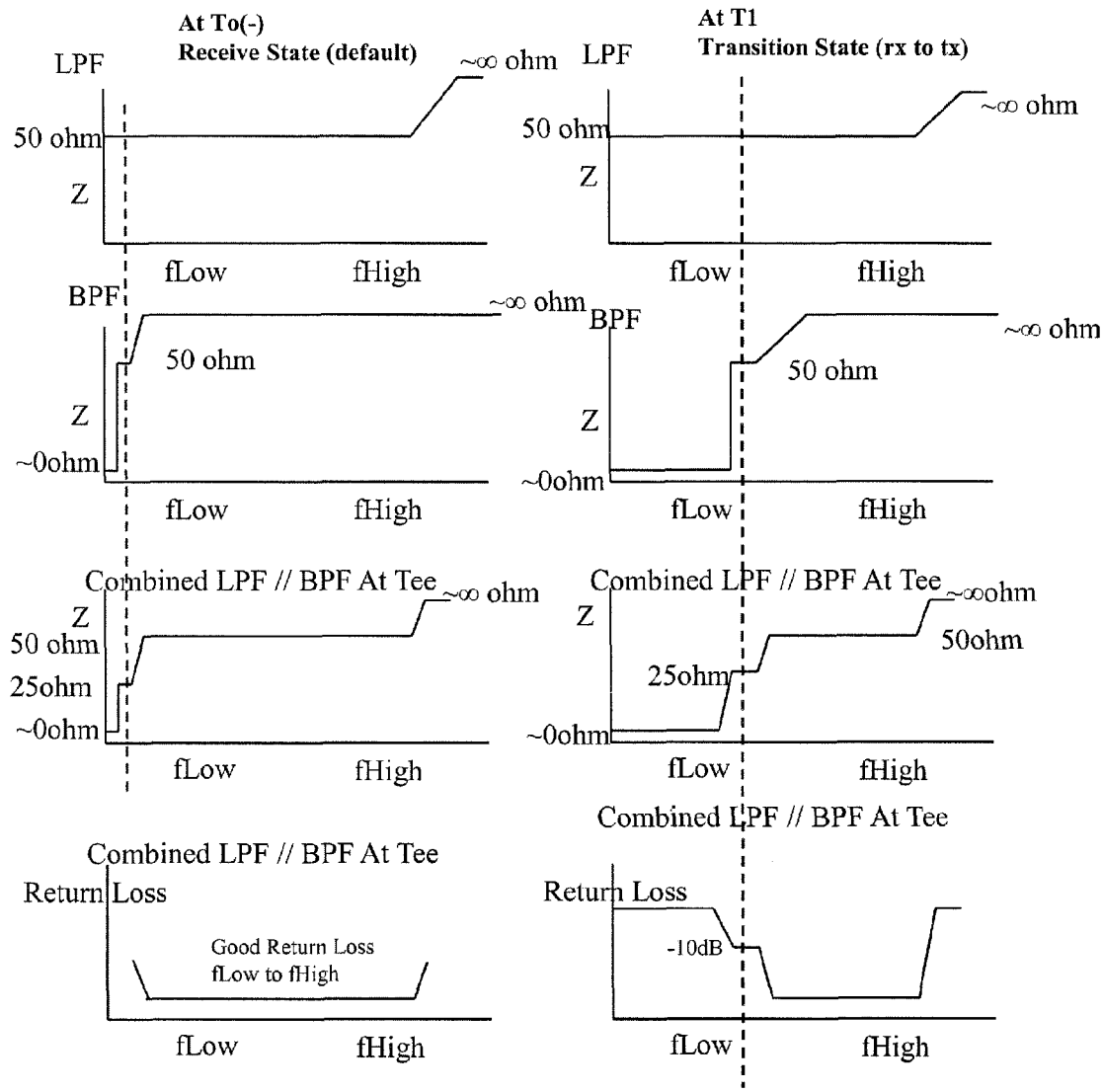
FIG. 2a shows plots of impedance and loss in the communication system when the communication system is in a receive state.
FIG. 2b shows plots of impedance and loss in the communication system when the communication system is in a transition state.

FIG. 2A shows plots of impedance and return loss vs. frequency when the communication system 100 is in the receive state in which the communication unit 2 can receive signals. As shown in FIG. 2A, the tunable low-pass filter 8 (LPF) is set to have a high cutoff frequency (High which is higher than any known possible received signal, thereby allowing received signals to pass through the tunable low-pass filter 8. The tunable low-pass filter 8 may have a matched impedance of 50 ohms in the frequency range of the signals to be received. The tunable bandpass filter 6 may be tuned to a very low frequency, lower than the lowest frequency signal that possibly may be received, such that the tunable bandpass filter 6 presents substantially an infinite impedance to received signals. Thus, as shown in FIG. 2A, the parallel combination of the tunable bandpass filter 6 and tunable low-pass filter 8 presents a 50 ohm impedance in the range of the received signals. As shown in FIG. 2A, the return loss is low due to the matching of the impedance (50 ohms, in this example) of the filters with that of the communication unit 2 and the antenna 14. The communication system 100 may be controlled to be in the receive state at any time that the communication unit 2 is not transmitting or transitioning between transmit and receive states.

FIG. 2B shows plots of impedance and return loss vs. frequency in a transition state in which the communication system 100 is transitioning from the receive state to the transmission state. In the transition state, the low-pass filter is controlled to maintain its cutoff frequency to be much higher than that of any known possible received signal, as in the received state, thereby presenting a 50 ohm impedance to a received signal. The bandpass filter 6 is tuned to the frequency of the signal to be transmitted, such that the bandpass filter 6 presents a 50 ohm impedance to the transmitted signal. As a result, as shown in FIG. 2B, the parallel combination of the low-pass filter and the tunable bandpass filter presents a 25 ohm impedance at the transmitted frequency in the transition state. As shown in FIG. 2B, the return loss is −10 db, which is higher than in the transmit state, but the parallel combination of the filters does not present a significant impedance mismatch, which avoids producing reflections of sufficient magnitude to cause to damage the communication unit 2 in the transition state. As a result, during the very short transition state, system 100 is not prone to high transmit power "hot" switching in which many simple tunable filter systems will fail. Any decrease in the frequency rejection of system 100 during the transition state will be brief enough so as not to present an issue for cosite interference.

Figure 2C:
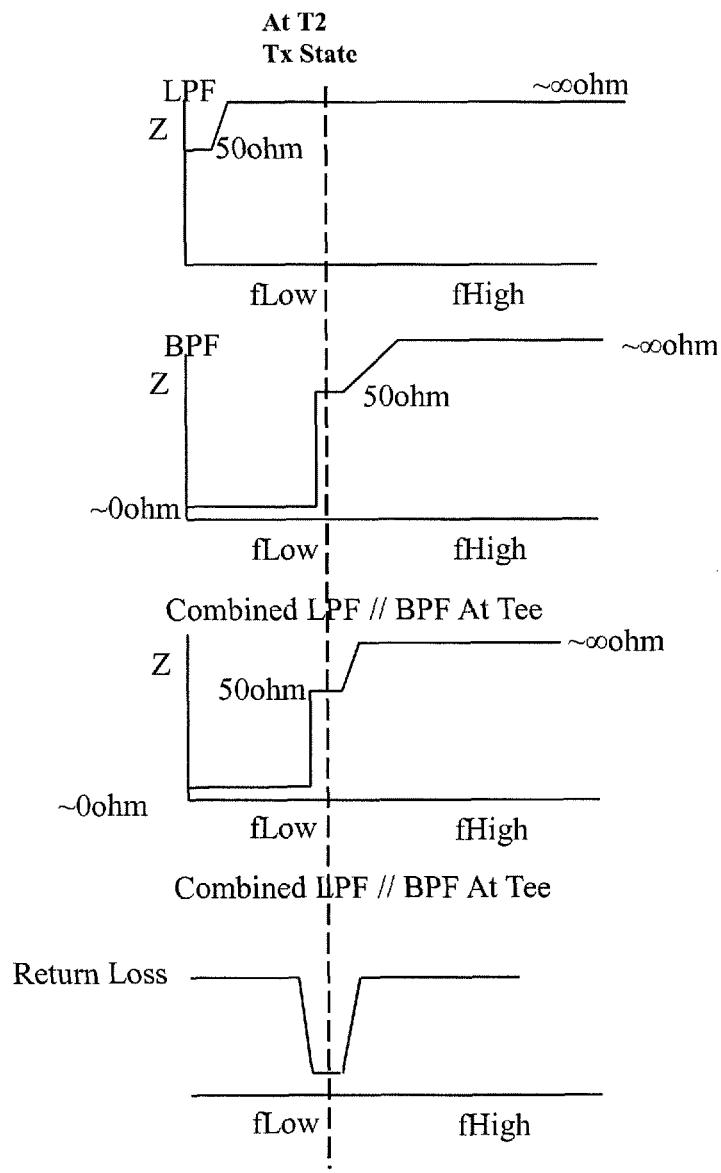
FIG. 2c shows plots of impedance and loss in the communication system when the communication system is in a transmit state.

FIG. 2C shows plots of impedance and return loss when the communication system 100 is in the transmit state in which the communication unit 2 can transmit signals. The cutoff frequency of the tunable low-pass filter 8 is set to a low frequency, lower than that of frequencies of interest, thus presenting substantially an infinite impedance at the transmitted frequency. The tunable bandpass filter 6 is tuned to the transmitted frequency, thereby presenting a 50 ohm impedance to the transmitted signal. As shown in FIG. 2C, the parallel combination of the tunable low-pass filter 8 and tunable bandpass filter 6 presents a 50 ohm impendence to the transmitted signal, which matches the 50 ohm output impedance of the communication unit 2 and produces a low return loss at the transmitted frequency.

In some embodiments, a plurality of co-located communication units may be used. For example, as discussed above, an airplane may have a radio as a first communication unit and a data link as a second communication unit. Each communication unit may be coupled to an antenna 14 through a parallel combination of a tunable bandpass filter 6 and a tunable low-pass filter 8, and each may have its own measurement and control unit 16.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

For example, embodiments of controllers, such as a controller used in measurement and control unit 16, may be implemented using hardware, software or a combination thereof. When implemented in software, the software code can be executed on any suitable hardware processor to or collection of hardware processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed to perform the functions recited above.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. A system for coupling a communication unit to an antenna, the system comprising:
   a tunable bandpass filter;
   a second tunable filter in parallel with the tunable bandpass filter; and
   a measurement and control unit configured to determine whether a transmission signal is being transmitted by the communication unit, the measurement and control unit further being configured to measure a frequency of the transmission signal when the transmission signal is being transmitted,
   wherein the measurement and control unit is further configured to:
      when the transmission signal is not being transmitted by the communication unit, tune the tunable bandpass filter to block a received signal within a frequency range and tune the second tunable filter to pass the received signal, and
      when the transmission signal is being transmitted by the communication unit, tune the tunable bandpass filter to pass the transmission signal and tune the second tunable filter to block the transmission signal.

2. The system of claim 1, wherein the second tunable filter comprises a low-pass filter.

3. The system of claim 1, wherein the measurement and control unit is configured to tune the second tunable filter such that an impedance of the second tunable filter in the frequency range is matched to an impedance of the communication unit when the transmission signal is not being transmitted by the communication unit.

4. The system of claim 1, wherein the measurement and control unit is configured to tune the tunable bandpass filter such that an impedance of the tunable bandpass filter is matched to an impedance of the antenna at a frequency of the transmission signal.

5. The system of claim 1, wherein the communication unit is a first communication unit and the system further comprises:
   a second tunable bandpass filter coupled to a second communication unit; and
   a fourth tunable filter in parallel with the second tunable bandpass filter.

6. The system of claim 5, wherein the second and fourth tunable filters are low-pass filters.

7. A method of coupling a communication unit to an antenna, the method comprising:
   in a transmit mode:
      measuring a frequency of a transmission signal transmitted by the communication unit; and
      tuning a tunable bandpass filter to pass the transmission signal; and
      tuning a second tunable filter in parallel with the tunable bandpass filter to block the transmission signal; and
   in a receive mode:
      tuning the second tunable filter to pass a received signal; and
      tuning the tunable bandpass filter to block the received signal,
   wherein a measurement and control unit:
      when the transmission signal is not being transmitted by the communication unit, tunes the tunable bandpass filter to block a received signal within a frequency range and tunes the second tunable filter to pass the received signal, and when the transmission signal is being transmitted by the communication unit, tunes the tunable bandpass filter to pass the transmission signal and tunes the second tunable filter to block the transmission signal.

8. The method of claim 7, wherein the second tunable filter comprises a low-pass filter, and tuning the second tunable filter comprises tuning the low-pass filter.

9. The method of claim 7, wherein in the receive mode the second tunable filter is tuned such that an impedance of the second tunable filter in a frequency range of the received signal is matched to an impedance of the communication unit.

10. The method of claim 7, wherein in the transmit mode the tunable bandpass filter is tuned such that an impedance of the tunable bandpass filter is matched to an impedance of the antenna at a frequency of the transmission signal.

11. A non-transitory computer readable storage medium having stored thereon instructions, which, when executed by a processor, perform a method of coupling a communication unit to an antenna, the method comprising:
   in a transmit mode:
      measuring a frequency of a transmission signal transmitted by the communication unit; and
      tuning a tunable bandpass filter to pass the transmission signal; and
      tuning a second tunable filter in parallel with the tunable bandpass filter to block the transmission signal; and
   in a receive mode:
      tuning the second tunable filter to pass a received signal; and
      tuning the tunable bandpass filter to block the received signal,
   wherein a measurement and control unit:
      when the transmission signal is not being transmitted by the communication unit, tunes the tunable bandpass filter to block a received signal within a frequency range and tunes the second tunable filter to pass the received signal, and
      when the transmission signal is being transmitted by the communication unit, tunes the tunable bandpass filter to pass the transmission signal and tunes the second tunable filter to block the transmission signal.

12. The non-transitory computer readable storage medium of claim 11, wherein the second tunable filter comprises a low-pass filter, and tuning the second tunable filter comprises tuning the low-pass filter.

13. The non-transitory computer readable storage medium of claim 11, wherein in the receive mode the second tunable filter is tuned such that an impedance of the second tunable filter in a frequency range of the received signal is matched to an impedance of the communication unit.

14. The non-transitory computer readable storage medium of claim 11, wherein in the transmit mode the tunable bandpass filter is tuned such that an impedance of the tunable bandpass filter is matched to an impedance of the antenna at a frequency of the transmission signal.

* * * * *